US010306625B2

(12) United States Patent
Centonza et al.

(10) Patent No.: US 10,306,625 B2
(45) Date of Patent: May 28, 2019

(54) METHODS AND NETWORK NODES FOR USE IN A COMMUNICATION NETWORK

(71) Applicant: Telefonaktiebolaget L M Ericsson (publ), Stockholm (SE)

(72) Inventors: Angelo Centonza, Winchester (GB); Erik Eriksson, Linköping (SE); Lars Lindbom, Karlstad (SE); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 577 days.

(21) Appl. No.: 14/385,784

(22) PCT Filed: Jul. 3, 2014

(86) PCT No.: PCT/SE2014/050850
§ 371 (c)(1),
(2) Date: Sep. 17, 2014

(87) PCT Pub. No.: WO2015/020589
PCT Pub. Date: Feb. 12, 2015

(65) Prior Publication Data
US 2016/0113007 A1    Apr. 21, 2016

Related U.S. Application Data

(60) Provisional application No. 61/863,969, filed on Aug. 9, 2013.

(51) Int. Cl.
*H04W 72/04* (2009.01)
*H04B 7/26* (2006.01)
(Continued)

(52) U.S. Cl.
CPC ...... *H04W 72/0446* (2013.01); *H04B 7/2656* (2013.01); *H04J 11/0056* (2013.01);
(Continued)

(58) Field of Classification Search
CPC ............... H04W 24/02; H04W 72/082; H04W 72/0426; H04W 72/12; H04W 56/00; H04W 36/0061; H04W 28/26; H04W 52/243; H04B 7/2643; H04J 11/0023; H04J 11/005
USPC .................................................. 370/254, 280
See application file for complete search history.

(56) References Cited

U.S. PATENT DOCUMENTS

| 9,084,275 | B2* | 7/2015 | Wang | ................ H04W 72/1231 |
| 2011/0149813 | A1* | 6/2011 | Parkvall | ............... H04B 7/2656 370/280 |
| 2016/0007232 | A1* | 1/2016 | Wang | ................... H04B 7/0456 370/280 |

FOREIGN PATENT DOCUMENTS

| CN | 101790178 A | 7/2010 |
| CN | 102014510 A | 4/2011 |

(Continued)

OTHER PUBLICATIONS

3gppTS 36.423 v11.50 (Jun. 2013).*
(Continued)

*Primary Examiner* — Marsha D Banks Harold
*Assistant Examiner* — Elton Williams
(74) *Attorney, Agent, or Firm* — Murphy, Bilak & Homiller, PLLC

(57) ABSTRACT

According to an aspect, there is provided a method of operating a network node in a communication network. The method comprises determining (121) a preferred configuration for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions; and transmitting (125) a message to a neighbouring network node in the communication network through an inter node interface, the message indicating the preferred configuration for the one or more flexible subframes.

88 Claims, 14 Drawing Sheets

(51) Int. Cl.
   *H04J 11/00* (2006.01)
   *H04L 27/26* (2006.01)
   *H04L 5/14* (2006.01)
(52) U.S. Cl.
   CPC ............ *H04L 5/14* (2013.01); *H04L 27/2602* (2013.01); *H04W 72/0406* (2013.01)

(56) References Cited

FOREIGN PATENT DOCUMENTS

| WO | 2011077288 A2 | 6/2011 |
|---|---|---|
| WO | 2011077288 A3 | 6/2011 |
| WO | 2012134581 A1 | 10/2012 |

OTHER PUBLICATIONS

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.5.0, Jun. 2013, 1-143.

Unknown, Author , "Backhaul Signaling Support for ICIC in Dynamic TDD UL-DL Reconfigurations", LG Electronics, 3GPP TSG RAN WG1 Meeting #73, R1-132227, Fukuoka, Japan, May 20-24, 2013, 1-5.

Unknown, Author , "On the need of new backhaul signaling for interference mitigation", Ericsson, ST-Ericsson, 3GPP TSG-RAN WG1#73, R1-132023, Fukuoka, Japan, May 20-24, 2013, 1-2.

* cited by examiner

| IE/ Group Name | Presence | Range | IE Type and reference | Semantics Description | Criticality | Assigned Criticality |
|---|---|---|---|---|---|---|
| >TDD | | | | | - | - |
| >>TDD Info | | 1 | | | | |
| >>>EARFCN | M | | 9.2.26 | Corresponds to $N_{DL}/N_{UL}$ in ref. TS 36.104 [16] | - | - |
| >>>Transmission Bandwidth | M | | Transmission Bandwidth 9.2.27 | | - | - |
| >>>Subframe Assignment | M | | ENUMERATED (sa0, sa1, sa2, sa3, sa4, sa5, sa6,..., new enumerated values for flexible subframes configurations) | Uplink- downlink subframe configuration information defined in ref. TS 36.211 [10] | - | - |
| >>>Special Subframe Info | | 1 | | Special subframe configuration information defined in ref. TS 36.211 [10] | - | - |
| >>>>Special Subframe Patterns | M | | ENUMERATED (ssp0,ssp1, ssp2, ssp3, ssp4, ssp5, ssp6, ssp7, ssp8, ..., ssp9) | | - | - |
| >>>>Cyclic Prefix DL | M | | ENUMERATED (Normal, Extended, ...) | | - | - |
| >>>>Cyclic prefix UL | M | | ENUMERATED (Normal, Extended, ...) | | - | - |

Figure 11

| IE/Group Name | Presence | Range | IE Type and reference | Semantics Description | Criticality | Assigned Criticality |
|---|---|---|---|---|---|---|
| >TDD | | | | | - | - |
| >>TDD Info | | 1 | | | | |
| >>>EARFCN | M | | 9.2.26 | | - | - |
| >>>Transmission Bandwidth | M | | Transmission Bandwidth 9.2.27 | | - | - |
| >>>Subframe Assignment | M | | ENUMERATED (sa0, sa1, sa2, sa3, sa4, sa5, sa6,...) | Corresponds to $N_{DL}/N_{UL}$ in ref. TS 36.104 [16] | - | - |
| >>>Flexible subframe assignment | O | | ENUMERATED (sa0, sa1, sa2, sa3, sa4, sa5, sa6,...) | Uplink- downlink subframe configuration information defined in ref. TS 36.211 [10] | - | - |
| >>>Special Subframe Info | | 1 | | Flexible subframe configuration information used in combination with Subframe | - | - |
| >>>>Special Subframe Patterns | M | | ENUMERATED (ssp0, ssp1, ssp2, ssp3, ssp4, ssp5, ssp6, ssp7, ssp8, ..., ssp9) | Special subframe configuration information defined in ref. TS 36.211 [10] | - | - |
| >>>>Cyclic Prefix DL | M | | ENUMERATED (Normal, Extended,....) | | - | - |
| >>>>Cyclic prefix UL | M | | ENUMERATED (Normal, Extended,....) | | - | - |

Figure 12

| IE/Group Name | Presence | Range | IE Type and reference | Semantics Description | Criticality | Assigned Criticality |
|---|---|---|---|---|---|---|
| Message Type | M | | 9.2.13 | | YES | Ignore |
| Cell Information | M | | | | YES | Ignore |
| >Cell Information Item | | 1..<maxCellineNB> | | | EACH | Ignore |
| >>Cell ID | M | | ECGI 9.2.14 | Id of the source cell | - | - |
| >>UL Interference Overload Indication | O | | 9.2.17 | | - | - |
| >>UL High Interference Information | | 0..<maxCellineNB> | | | - | - |
| >>>Target Cell ID | M | | ECGI 9.2.14 | Id of the cell for which the HII is meant | - | - |
| >>>UL High Interference Indication | M | | 9.2.18 | | - | - |
| >>Relative Narrowband Tx Power (RNTP) | O | | 9.2.19 | | - | - |
| >>ABS Information | O | | 9.2.54 | | YES | Ignore |
| >>Invoke Indication | O | | 9.2.55 | | YES | Ignore |
| >>Flexible Subframes pattern Info | O | | | | | |

Figure 14

| IE/ Group Name | Presence | Range | IE Type and reference | Semantics Description | Criticality | Assigned Criticality |
|---|---|---|---|---|---|---|
| Flexible subframe pattern | M | | BIT STRING (SIZE(10)) | Each position in the bitmap represents a subframe, for which value "1" indicates 'Flexible subframe' and value "0" indicates 'non flexible subframe'. | | |
| Flexible subframe configuration | O | | BIT STRING (SIZE(10)) | Each position in the bitmap represents a subframe, for which value "1" indicates 'UL utilisation' and value "0" indicates 'DL utilisation'. | | |

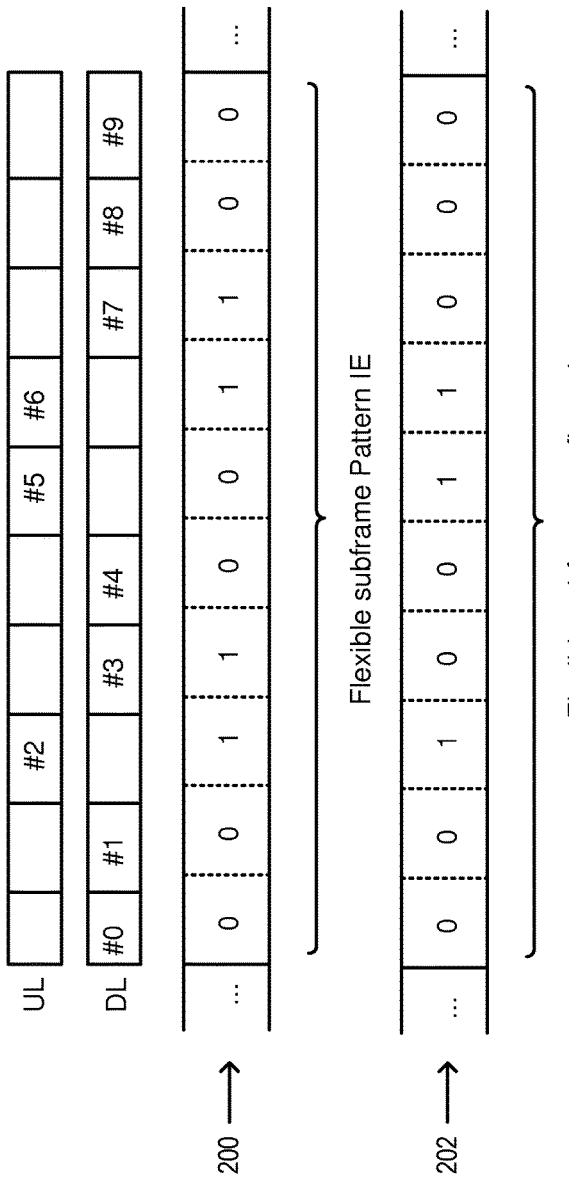

| IE/ Group Name | Presence | Range | IE Type and reference | Semantics Description | Criticality | Assigned Criticality |
|---|---|---|---|---|---|---|
| >>SubframeS list | | 1..<maxnoof Subframes> | | | | |
| Utilisation per PRB | M | | BIT STRING (6..110,....) | Each position in the bitmap represents a value (i.e. first bit = PRB 0 and so on) Value 0 Indicates "No UL Scheduling". | - | - |
| UL power Tx threshold | O | | | | | |

Figure 18

| IE/ Group Name | Presence | Range | IE Type and reference | Semantics Description | Criticality | Assigned Criticality |
|---|---|---|---|---|---|---|
| Subframes list | | 1..<maxnoof Subframes> | | | | |
| >> UL interference Overload Indication List | | 1..<maxnoof PRBs> | | | | |
| >> UL interference Overload Indication | M | | ENUMERATED (high interference, medium interference, low interference, ...) | Each PRB is identified by its position in the list: the first element in the list corresponds to PRB 0, the second to PRB 1, etc. | | |

Figure 19

METHODS AND NETWORK NODES FOR USE IN A COMMUNICATION NETWORK

TECHNICAL FIELD

The technology pertains to a communication network that implements a flexible subframe structure, and in particular to methods and network nodes for use in a communication network for exchanging information about the configuration of flexible subframes with other network nodes.

BACKGROUND

In a typical cellular radio system, radio or wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (in a Universal Mobile Telecommunications System (UMTS) network) or "eNodeB" (in a Long Term Evolution (LTE) network). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UEs) within range of the base stations.

In some radio access networks, several base stations may be connected (e.g., by landlines or microwave) to a radio network controller (RNC) or a base station controller (BSC). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). Universal Terrestrial Radio Access Network (UTRAN) is essentially a radio access network using a wideband code division multiple access (WCDMA) air interface between user equipment units (UEs) and the radio access network (RAN).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. The first release for the Evolved Universal Terrestrial Radio Access Network (E-UTRAN) specification has issued, and as with most specifications, the standard is likely to evolve. The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology where the radio base station nodes are connected to a core network (via Access Gateways (AGWs)) rather than to radio network controller (RNC) nodes. In general, in LTE the functions of a radio network controller (RNC) node are distributed between the radio base stations nodes (eNodeBs in LTE) and AGWs. As such, the radio access network (RAN) of an LTE system has what is sometimes termed a "flat" architecture including radio base station nodes without reporting to radio network controller (RNC) nodes.

Transmission and reception from a node, e.g., a radio terminal like a UE in a cellular system such as LTE, can be multiplexed in the frequency domain or in the time domain (or combinations thereof). In Frequency Division Duplex (FDD), as illustrated to the left in FIG. 1, downlink and uplink transmission take place in different, sufficiently separated, frequency bands. In Time Division Duplex (TDD), as illustrated to the right in FIG. 1, downlink and uplink transmission take place in different, non-overlapping time slots. Thus, TDD can operate in unpaired frequency spectrum, whereas FDD requires paired frequency spectrum.

Typically, a transmitted signal in a communication system is organized in some form of frame structure. For example, LTE uses ten equally-sized subframes 0-9 of length 1 ms per radio frame as illustrated in FIG. 2.

In the case of FDD operation (illustrated in the upper part of FIG. 2), there are two carrier frequencies, one for uplink transmission (fUL) and one for downlink transmission (fDL). At least with respect to the radio terminal in a cellular communication system, FDD can be either full duplex or half duplex. In the full duplex case, a terminal can transmit and receive simultaneously, while in half-duplex operation (see FIG. 1), the terminal cannot transmit and receive simultaneously (although the base station is capable of simultaneous reception/transmission, i.e., receiving from one terminal while simultaneously transmitting to another terminal). In LTE, a half-duplex radio terminal monitors/receives in the downlink except when explicitly instructed to transmit in the uplink in a certain subframe.

In the case of TDD operation (illustrated in the lower part of FIG. 2), there is only a single carrier frequency, and uplink and downlink transmissions are separated in time also on a cell basis. Because the same carrier frequency is used for uplink and downlink transmission, both the base station and the mobile terminals need to switch from transmission to reception and vice versa. An important aspect of a TDD system is to provide a sufficiently large guard time where neither downlink nor uplink transmissions occur in order to avoid interference between uplink and downlink transmissions. For LTE, special subframes (subframe 1 and, in some cases, subframe 6) provide this guard time. A TDD special subframe is split into three parts: a downlink part (DwPTS), a guard period (GP), and an uplink part (UpPTS). The remaining subframes are either allocated to uplink or downlink transmission.

Time division duplex (TDD) allows for different asymmetries in terms of the amount of resources allocated for uplink and downlink transmission, respectively, by means of different downlink/uplink configurations. In LTE, there are seven different configurations as shown in FIG. 3. The configurations cover a wide range of allocations from uplink heavy with a DL to UL ratio of 2:3 (Configuration 0) to downlink heavy with a DL to UL ratio of 9:1 (Configuration 5).

To avoid significant interference between downlink and uplink transmissions between different cells, neighbour cells should have the same downlink/uplink configuration. Otherwise, uplink transmission in one cell may interfere with downlink transmission in the neighbouring cell (and vice versa) as illustrated in FIG. 4 where the uplink transmission of the UE in the right cell (MS2) is interfering with the downlink reception by the UE in the left cell (MS1). As a result, the downlink/uplink asymmetry does not vary between cells. The downlink/uplink asymmetry configuration is signalled as part of the system information and remains fixed for a long period of time.

Heterogeneous networks refer to cellular networks deployed with base stations having different characteristics, mainly in terms of output power, and overlapping in coverage.

The term hierarchical cell structures is used to refer to one type of heterogeneous network deployment. One simple example of a heterogeneous network is a macro cell overlaying one or more low power nodes (LPNs) such as pico cells or femto cells (also known as home eNBs).

A characteristic of heterogeneous networks is that the output powers of different cells (at least partially) covering the same area are different. For example, the output power of a pico base station or a relay might be on the order of 30 dBm or less, while a macro base station might have a much larger output power of 46 dBm. Consequently, even in the proximity of the pico cell, the downlink signal strength from the macro cell can be larger than that of the pico cell.

Cell selection is typically based on received signal strength, i.e., the UE terminal connects to the strongest downlink. However, due to the difference in downlink transmission power between different cells, (e.g., macro and pico), this does not necessarily correspond to the best uplink. From an uplink perspective, it would be better to select a cell based on the uplink path loss as illustrated in FIG. 5 (the inverse of the uplink path loss is illustrated in dashed lines while the solid lines show the received downlink power from both cells/base stations). If uplink path loss is used as the cell selection criterion, the UE transmits uplink using a lower uplink transmit power than if downlink received power is used. This would be beneficial from a capacity perspective since it allows reuse of the radio resources used by one pico cell-connected UE in another pico cell (assuming a sufficient distance between both of these pico cells) because the one pico cell-connected UE's uplink transmission power (and hence interference) can be reduced compared to what it would be if that UE were connected to the macro cell. However, connecting to the best uplink cell is possible, even if the cell selection is based on downlink signal strength measurements, by assigning different measurement offsets to the different cells.

But connecting to the cell with the best uplink does not mean that the best downlink is necessarily used. This condition is sometimes referred to as link imbalance. If the two cells in FIG. 5 transmit on the same frequency, downlink transmissions from the pico cell are subject to strong interference from macro cell downlink transmissions, and in certain regions surrounding the pico base station, it may not be possible for a UE to receive the transmissions from the pico cell. In other words, macro-to-pico downlink interference prevents the UE from receiving from the pico cell.

Solving the uplink-downlink imbalance is important in heterogeneous networks. A simple solution is to operate different overlapping cells or cell "layers" on different (sufficiently separated) frequencies. One approach in situations where different frequencies cannot be used for different cell layers is to employ uplink desensitization by decreasing the receiver sensitivity in the pico base station such that the uplink and downlink cell boundaries coincide, i.e., the 'Gray region' in FIG. 5 surrounding the pico base station shrinks and eventually disappears. In LTE, decreasing the sensitivity is not required because a higher received power can be achieved by proper setting of the power control parameters, i.e., P0. This resolves the problem of receiving downlink transmissions from the pico cell at the cost of using a higher received power target in the pico cell.

As indicated above, time division duplex (TDD) networks typically use a fixed frame configuration where some subframes are uplink and some are downlink. This prevents or at least limits the flexibility to adopt the uplink/downlink resource asymmetry to varying traffic situations. Heterogeneous deployments typically separate the cell layers in frequency, which comes at a cost in terms of the spectrum required or the use of desensitization to mitigate the link imbalance problem, which artificially decreases uplink performance.

WO 2011/077288 describes an approach to mitigate these problems. In particular, WO 2011/077288 provides the ability for a subframe to be configured as a "flexible" subframe, which means that at least three different types of subframes can be configured in a TDD system: a downlink (DL) subframe, an uplink (UL) subframe and a "flexible" subframe. Each flexible subframe can be dynamically allocated to be an uplink subframe in one instance of a frame and a downlink subframe in another frame instance. Information is generated for a radio terminal indicating how the radio terminal should interpret or use one or more flexible subframes.

Downlink subframes (which exist in LTE Rel-8) are used (among other things) for transmission of downlink data, system information, control signalling and hybrid-ARQ (hybrid-automatic repeat request) feedback in response to uplink transmission activity. The UE is monitoring the physical downlink control channel (PDCCH) as in LTE Rel-8, i.e. it may receive scheduling assignments and scheduling grants. Special subframes (as shown in FIG. 2) are similar to downlink subframes except, in addition to the downlink part, they include also a guard period as well as a small uplink part in the end of the subframe to be used for random access or sounding.

Uplink subframes (which exist in LTE Rel-8) are used (among other things) for transmission of uplink data, uplink control signalling (channel-status reports), and hybrid-ARQ feedback in response to downlink data transmission activity. Data transmission on the physical uplink shared channel (PUSCH) in uplink subframes are controlled by uplink scheduling grants received on a PDCCH in an earlier subframe.

Flexible subframes as described in WO 2011/077288 (which are not specified in LTE Rel-8) can be used for uplink or downlink transmissions as determined by scheduling assignments/grants.

SUMMARY

A problem exists in that inappropriate usage of flexible subframes can result in base station to base station interference (as shown in FIG. 4) and a consequential reduction in UL throughput in the victim cell (i.e. the cell in which the interference occurs).

Therefore there is a need for a technique for allowing a base station to communicate or exchange information with another base station or other network node about the configuration of flexible subframes.

According to an exemplary embodiment, there is provided a method of operating a network node in a communication network. The method comprises determining a preferred configuration for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions. The method further comprises transmitting a message to a neighbouring network node in the communication network through an inter node interface, the message indicating the preferred configuration for the one or more flexible subframes.

The method can further comprise adopting the preferred configuration of the one or more flexible subframes after the message is sent to the neighbouring network node and using the preferred configuration in communications with mobile devices.

The method can alternatively comprise receiving an acknowledgement of the transmitted message and then using the preferred configuration in communications with mobile devices.

The method can alternatively comprise receiving a message from the neighbouring network node through the inter node interface indicating a preferred configuration of the neighbouring network node for the one or more flexible subframes in the frame and determining the configuration of the one or more flexible subframes in the frame using the preferred configuration indicated in the received message and the preferred configuration of the network node. Once the configuration has been determined, it is then used in communications with mobile devices. This method can also comprise transmitting an acknowledgement to the neighbouring network node on receipt of the message indicating the preferred configuration of the neighbouring network node.

A corresponding method of operating a network node in a communication network is also provided. The method comprises receiving a message from a neighbouring network node in the communication network through an inter node interface, the message indicating a preferred configuration of the neighbouring network node for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions. The method also comprises the step of determining the configuration of the one or more flexible subframes in the frame using the preferred configuration indicated in the received message.

The method can further comprise using the determined configuration in communications with mobile devices.

The method can further comprise transmitting an acknowledgement of the received message to the neighbouring network node.

The method can further comprise the network node determining a preferred configuration for the one or more flexible subframes in the frame, and determining the configuration of the one or more flexible subframes using the preferred configuration of the network node and the preferred configuration of the neighbouring network node indicated in the received message.

The message indicating the preferred configuration for the one or more flexible subframes can be sent via an X2 interface between the network nodes. The message can be a message sent during the set up of an X2 interface, and for example may be an X2 SETUP message or an eNB CONFIGURATION UPDATE message.

In some embodiments, an information element (IE) in the message has a set of predefined values each corresponding to a respective configuration of the subframes in the frame, and the network node selects a predefined value for the IE corresponding to the preferred configuration for the one or more flexible subframes. In this embodiment, the message can be an X2 SETUP message and the information element (IE) can be the Subframe Assignment IE.

In other embodiments, multiple IEs can be used to indicate the flexible subframe configuration. For example the flexible subframe configuration can be indicated in the X2 SETUP message using the Subframe Assignment IE and an additional IE. The additional IE can have a set of predefined values each corresponding to a respective configuration of the one or more flexible subframes, and the network node selects a predefined value for the Subframe Assignment IE and a value for the additional IE corresponding to the preferred configuration for the one or more flexible subframes to include in the X2 SETUP message.

On receipt of an X2 SETUP message from a neighbouring network node, the (receiving) network node reads the value for the Subframe Assignment IE and the additional IE (if included) to determine the neighbouring network node's preferred configuration for the one or more flexible subframes.

In alternative embodiments, the message indicating the preferred configuration for the one or more flexible subframes is included in a message that is used to transfer load and interference co-ordination information between network nodes. This message can be a LOAD INFORMATION message. The message can include an IE indicating the uplink or downlink configuration for each of the one or more flexible subframes. Alternatively, the message can include two IEs, with a first IE indicating which subframes in the frame are flexible subframes, and a second IE indicating the uplink or downlink configuration for the indicated flexible subframes. In some cases, the second IE can also indicate whether the non-flexible subframes indicated in the first IE are allocated to uplink or downlink transmissions.

In further embodiments, the message indicating the preferred configuration for the one or more flexible subframes further comprises information on the transmission power that is going to be used in the frame and/or a maximum transmission power than can be used in the frame. The information on the actual and/or maximum transmission power can be provided for particular subframes, for example just the flexible subframes, just the uplink subframes (including the flexible subframes allocated to uplink), just the downlink subframes (including the flexible subframes allocated to downlink), or for all subframes. Alternatively or in addition, the information on the actual and/or maximum transmission power can be provided per physical resource block in the frame.

The network node receiving the message containing the actual and/or maximum transmission power can read this information and use it in determining the configuration of the flexible subframes to use in communicating with mobile devices.

In some embodiments, the information on the actual and/or maximum transmission power is included in a relative narrowband transmit power (RNTP) IE that is adapted to include information on time resources. In other embodiments, the information on the actual and/or maximum transmission power is included in an IE in a LOAD INFORMATION message.

In further or alternative embodiments, the message indicating the preferred configuration for the one or more flexible subframes further comprises information on the interference level experienced by the network node that transmits the message. Information on the interference level is preferably provided for each subframe and/or resource block. This information can be included in an IE in the LOAD INFORMATION message. The network node receiving the message containing the interference level information can read this information and use it in determining the configuration of the flexible subframes and/or in determining the transmission power to use in communicating with mobile devices.

In further or alternative embodiments, the message indicating the preferred configuration for the one or more flexible subframes can further comprise, or be followed by, information on the traffic demand in the uplink and/or downlink. This information can be read by the network node receiving the message and the network node can use this information in determining the configuration of the flexible subframes.

According to other aspects, there is provided a network node for use in a communication network, the network node comprising a processing module configured to determine a preferred configuration for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions and to form a message indicating the preferred configuration for the one or more flexible subframes. The network also comprises circuitry configured to transmit the message to a neighbouring network node in the communication network through an inter node interface.

Another aspect provides a network node for use in a communication network that comprises circuitry configured to receive a message from a neighbouring network node in the communication network through an inter node interface, the message indicating a preferred configuration of the neighbouring network node for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions. The network node also comprises a processing module configured to determine the configuration of the one or more flexible subframes in the frame using the preferred configuration indicated in the received message.

Various embodiments of the above network node aspects are also contemplated that correspond to the method embodiments described above.

In the above embodiments, the network node is preferably a base station, for example an eNodeB, an eNB, a Node B, a macro/micro/pico/femto radio base station, a home eNodeB, a relay, a repeater, a sensor, a transmitting-only radio node or a receiving-only radio node.

According to another aspect there is provided a network node for use in a communication network. The network node is adapted to determine a preferred configuration for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions and to form a message indicating the preferred configuration for the one or more flexible subframes; and transmit the message to a neighbouring network node in the communication network through an inter node interface.

According to another aspect, there is provided a network node for use in a communication network. The network node is adapted to receive a message from a neighbouring network node in the communication network through an inter node interface, the message indicating a preferred configuration of the neighbouring network node for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions; and determine the configuration of the one or more flexible subframes in the frame using the preferred configuration indicated in the received message.

According to another aspect there is provided a network node for use in a communication network, the network node comprising a processor and a memory. The memory contains instructions executable by said processor whereby said network node is operative to determine a preferred configuration for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions and to form a message indicating the preferred configuration for the one or more flexible subframes; and transmit the message to a neighbouring network node in the communication network through an inter node interface.

According to another aspect, there is provided a network node for use in a communication network, the network node comprising a processor and a memory. The memory contains instructions executable by said processor whereby said network node is operative to receive a message from a neighbouring network node in the communication network through an inter node interface, the message indicating a preferred configuration of the neighbouring network node for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions; and determine the configuration of the one or more flexible subframes in the frame using the preferred configuration indicated in the received message.

According to another aspect there is provided a network node for use in a communication network, the network node comprising processing means for determining a preferred configuration for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions and to form a message indicating the preferred configuration for the one or more flexible subframes. The network node also comprises transmitting means for transmitting the message to a neighbouring network node in the communication network through an inter node interface.

According to another aspect, there is provided a network node for use in a communication network, the network node comprising receiving means for receiving a message from a neighbouring network node in the communication network through an inter node interface, the message indicating a preferred configuration of the neighbouring network node for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions. The network node also comprises processing means for determining the configuration of the one or more flexible subframes in the frame using the preferred configuration indicated in the received message.

The "processing means", "transmitting means" and "receiving means" of the network nodes described above may in some embodiments be implemented as computer programs stored in memory (e.g. the memory module of FIG. 8 for execution by processors (e.g. the processing module of FIG. 8).

Further embodiments of the above-defined network nodes are contemplated in line with the various method and network node embodiments described above.

Yet another aspect provides a computer program product having computer readable code embodied therein, the computer readable code being such that, on execution by a suitable computer or processor, the computer or processor performs any of the method embodiments described above.

BRIEF DESCRIPTION OF THE DRAWINGS

FIG. 11 is a table showing a modified X2 SETUP message that can be used to signal the configuration of the flexible subframes according to an embodiment;

FIG. 12 is a table showing a modified X2 SETUP message that can be used to signal the configuration of the flexible subframes according to another embodiment;

FIG. 14 is a table showing a modified LOAD INFORMATION message that can be used to signal the configuration of the flexible subframes according to another embodiment;

FIG. 15 shows part of a LOAD INFORMATION message according to another embodiment;

FIG. 16 illustrates an exemplary flexible subframe pattern and flexible subframe configuration;

FIG. 17 shows an information element that can be used to indicate maximum uplink transmission power according to an embodiment;

FIG. 18 shows a pair of information elements that can be used to indicate maximum uplink transmission power on a per physical resource block basis according to an embodiment; and FIG. 19 shows an information element that can be used to indicate interference levels on a per physical resource block basis according to an embodiment.

DETAILED DESCRIPTION

Figure 1:
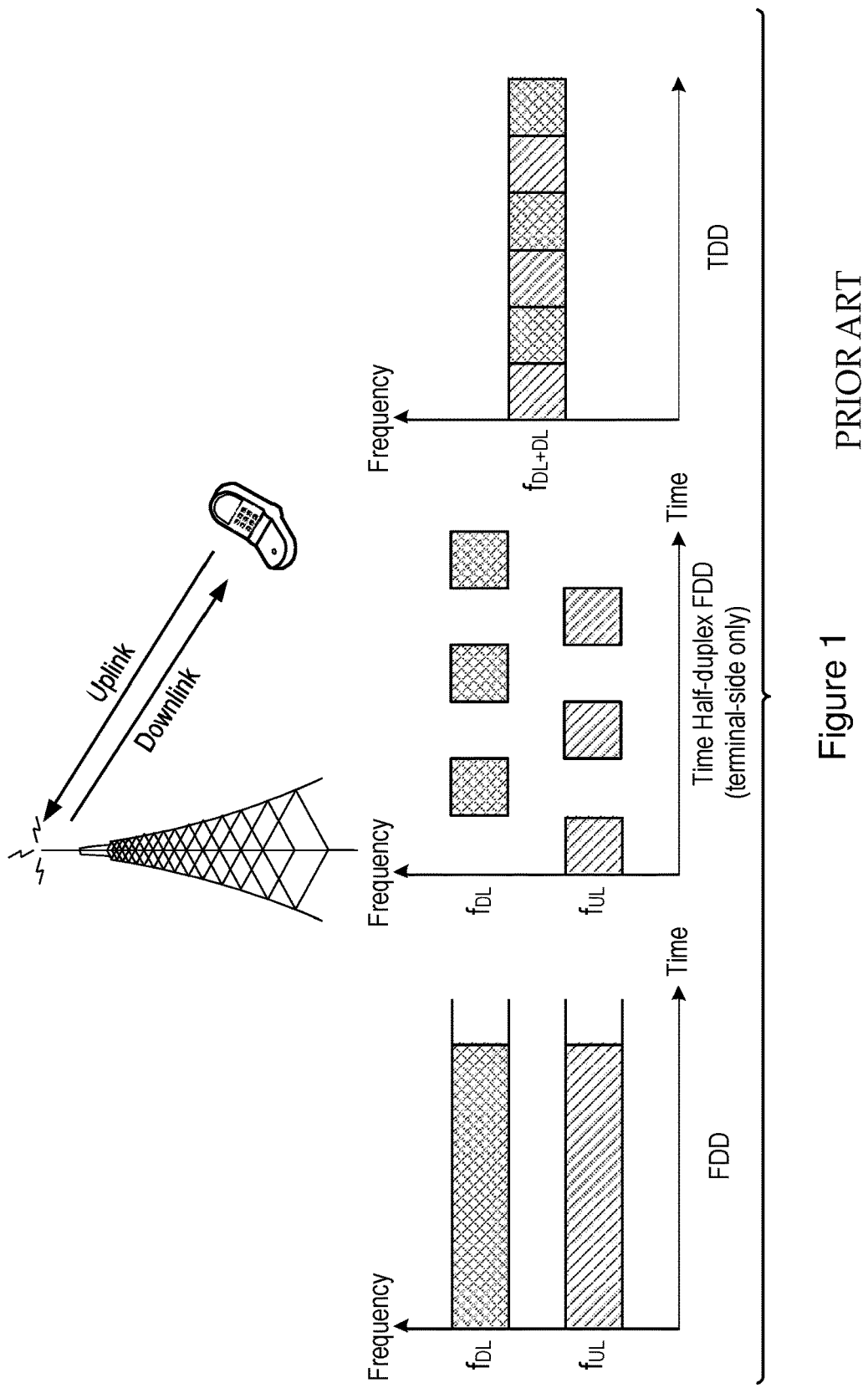
FIG. 1 illustrates frequency division duplex, half-duplex frequency division, and time division duplex transmissions.
Figure 2:
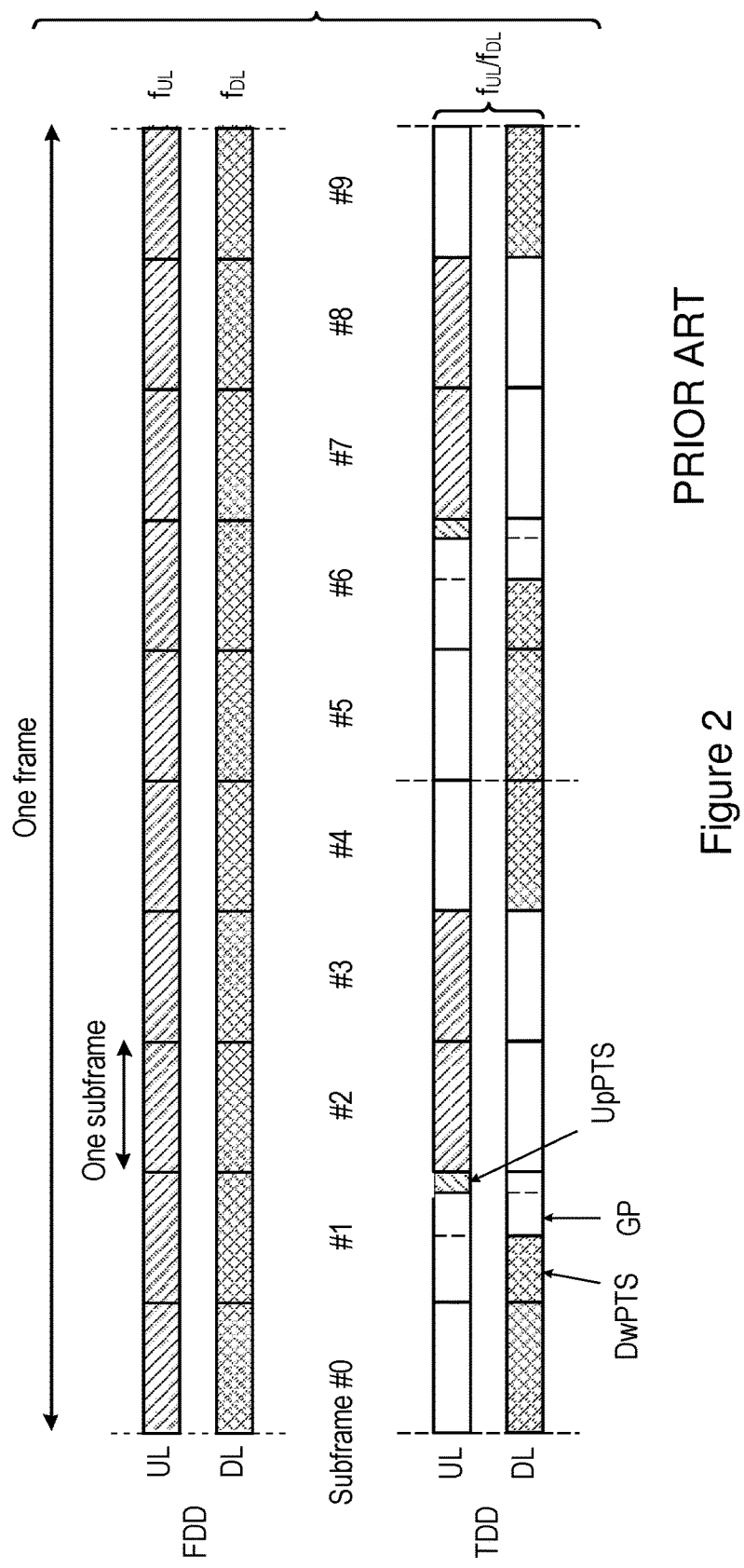
FIG. 2 illustrates uplink/downlink time/frequency structure for LTE separately in the case of frequency division duplex (FDD) and time division duplex (TDD)

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in UL and receiving and/or measuring signals in DL. A UE herein may comprise a UE (in its general sense) capable of operating or at least performing measurements in one or more frequencies, carrier frequencies, component carriers or frequency bands. It may be a "UE" operating in single- or multi-RAT or multi-standard mode. As well as "UE", the term "mobile device" is used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as GSM, UMTS, LTE, etc.

A cell is associated with a base station, where a base station comprises in a general sense any node transmitting radio signals in the downlink (DL) and/or receiving radio signals in the uplink (UL). Some example base stations or terms used for describing base stations are eNodeB, eNB, Node B, macro/micro/pico/femto radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs. Although the embodiments described below refer to a picocell base station as an example of a LPN within the coverage area of a macrocell base station, it will be appreciated that the teachings of this application are applicable to any type of heterogeneous deployment of nodes (e.g. a picocell base station within the coverage area of a microcell base station, a microcell base station within the coverage area of a macrocell base station, or a femtocell base station within the coverage area of any of a picocell, microcell or macrocell base station) and well as homogeneous deployments of nodes (e.g. neighbouring macrocell base stations).

The signalling described is either via direct links or logical links (e.g. via higher layer protocols and/or via one or more network nodes). For example, signalling from a coordinating node may pass another network node, e.g., a radio node.

Figure 6:
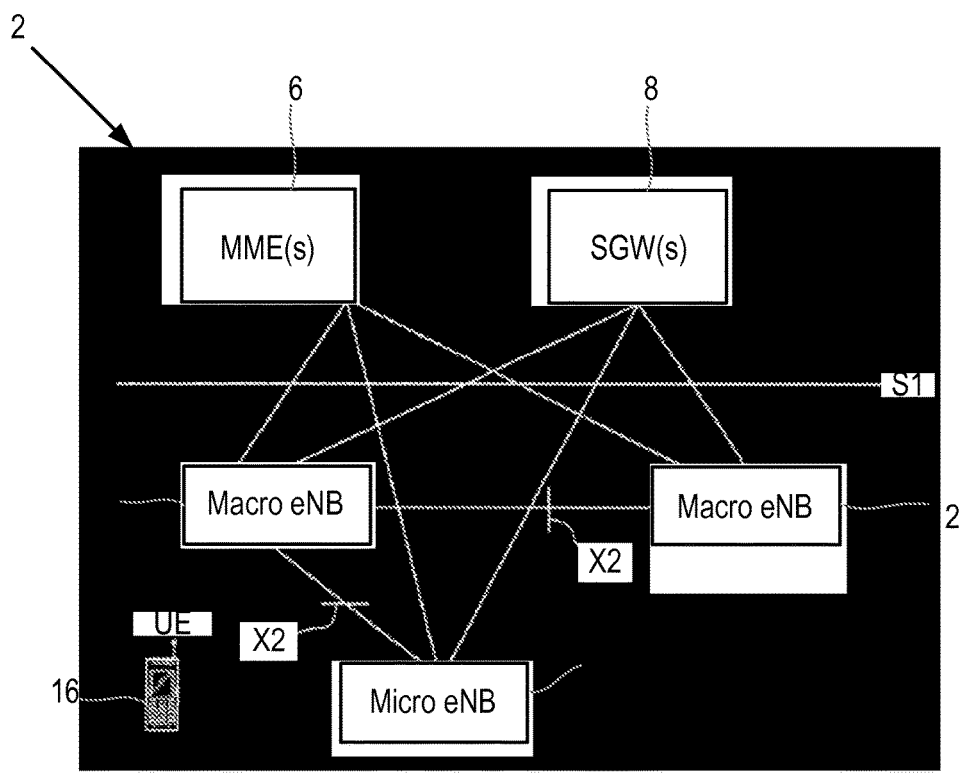
FIG. 6 is a non-limiting example block diagram of an LTE cellular communications network in which flexible subframes as described herein or encompassed hereby can be utilised.

FIG. 6 shows an example diagram of an LTE-based communications system 2. Nodes in the core network 4 include one or more Mobility Management Entities (MMEs) 6, a key control node for the LTE access network, and one or more Serving Gateways (SGWs) 8 which route and forward user data packets while and acting as a mobility anchor. They communicate with base stations 10, 12, 14, referred to in LTE as eNBs, over an interface, for example an S1 interface. The eNBs can include macro eNBs 10, 12 and micro eNBs 14 that communicate with each other over an interface, for example an X2 interface. The S1 interface and X2 interface are defined in the LTE standard. A UE 16 can receive downlink data from and send uplink data to one of the base stations 10, 12, 14, with that base station 10, 12, 14 being referred to as the serving base station of the UE 16.

Figure 7:
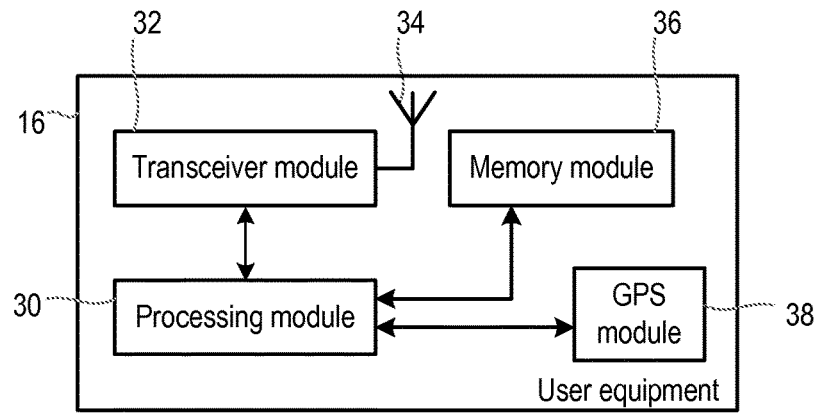
FIG. 7 is a block diagram of a mobile device according to an embodiment.

FIG. 7 shows a user equipment (UE) 16 that can be used in one or more of the non-limiting example embodiments described. The UE 16 comprises a processing module 30 that controls the operation of the UE 16. The processing module 30 is connected to a transceiver module 32 (which comprises a receiver and a transmitter) with associated antenna(s) 34 which are used to receive and transmit signals to/from a base station 10, 12, 14 in the network 2. The user equipment 16 also comprises a memory module 36 that is connected to the processing module 30 and that stores program and other information and data required for the operation of the UE 16. In some embodiments, the UE 16 may optionally comprise a satellite positioning system (e.g. GPS) receiver module 38 that can be used to determine the position and speed of movement of the UE 16.

Figure 8:
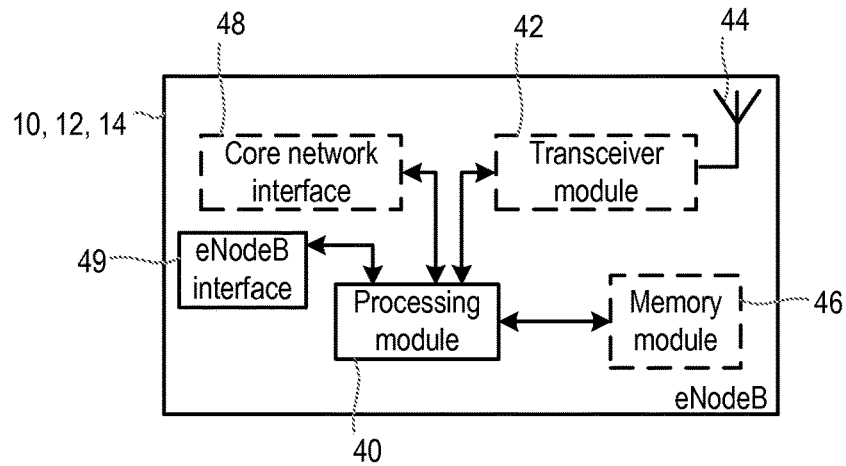
FIG. 8 is a block diagram of a base station according to an embodiment.

FIG. 8 shows a base station 10, 12, 14 (for example an eNode B) that can be used in example embodiments described. Although a macro eNB 10, 12 will not in practice be identical in size and structure to a micro eNB 14, for the purposes of illustration, the base stations 10, 12, 14 are assumed to include similar components. Thus, the base station 10, 12, 14 comprises a processing module 40 that controls the operation of the base station 10, 12, 14. The processing module 40 is connected to a transceiver module 42 (which comprises a receiver and a transmitter) with associated antenna(s) 44 which are used to transmit signals to, and receive signals from, user equipments 16 in the network 2. The base station 10, 12, 14 also comprises a memory module 46 that is connected to the processing module 40 and that stores program and other information and data required for the operation of the base station 10, 12, 14. The base station 10, 12, 14 also includes components and/or circuitry 48 for allowing the base station 10, 12, 14 to exchange information with other base stations 10, 12, 14 (for example via an X2 interface) and components and/or circuitry 49 for allowing the base station 10, 12, 14 to exchange information with nodes in the core network 4 (for example via the S1 interface).

Figure 9:
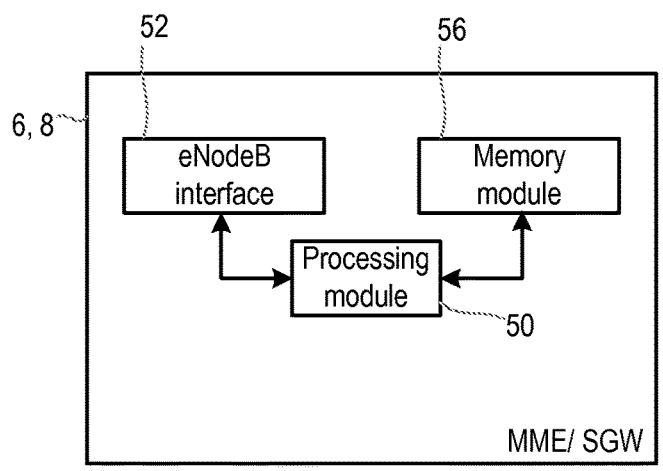
FIG. 9 is a block diagram of a network node according to an embodiment.

FIG. 9 shows a (core) network node 6, 8 that can be used in the example embodiments described. The node 6, 8 comprises a processing module 50 that controls the operation of the node 6, 8. The processing module 50 is connected to components and/or circuitry 52 for allowing the node 6, 8 to exchange information with the base stations 10, 12, 14 with which it is associated (which is typically via the S1 interface). The node 6, 8 also comprises a memory module 56 that is connected to the processing module 50 and that stores program and other information and data required for the operation of the node 6, 8.

As described above, WO 2011/077288 provides the ability for a subframe to be configured as a 'flexible' subframe, so-called because the subframe is not declared or configured in advance as being an uplink subframe or a downlink subframe. This technology is advantageous for example in time division duplex (TDD) based systems, but it is not limited solely to TDD systems.

Figure 4:
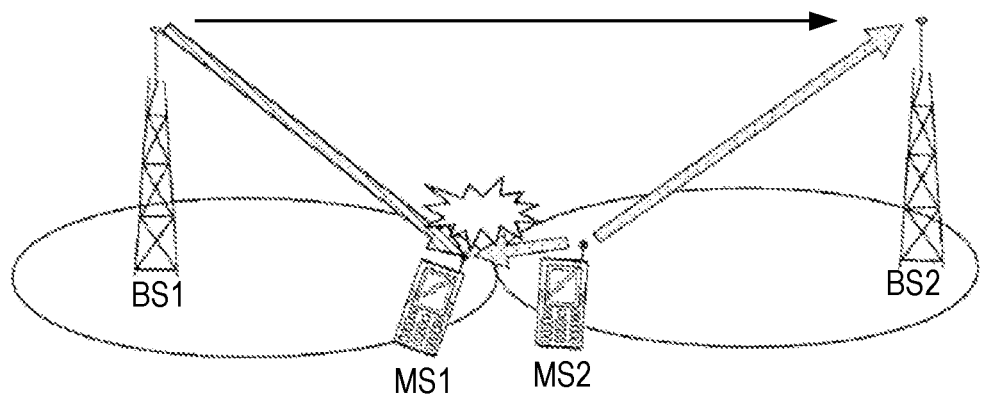
FIG. 4 illustrates an example of uplink/downlink (UL/DL) interference in time division duplex (TDD)
Figure 5:
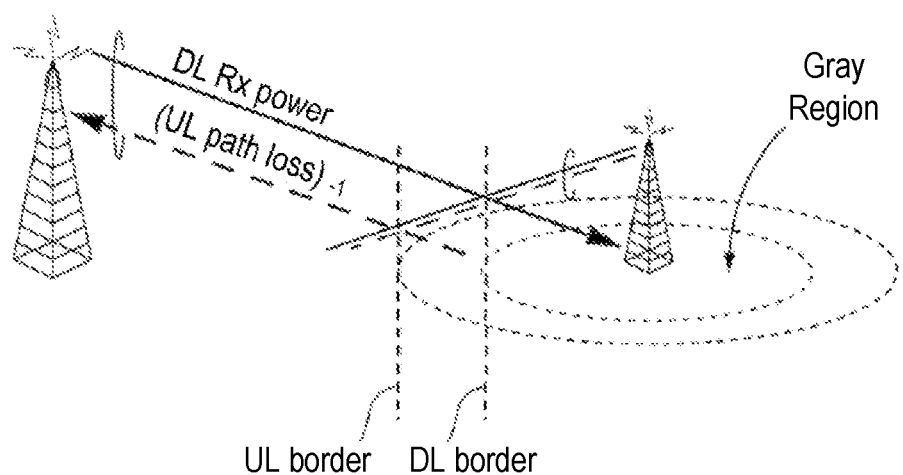
FIG. 5 illustrates an example of uplink and downlink coverage in a mixed cell scenario.

To avoid inter-cell interference as shown in FIG. 4, neighbouring cells (including overlapping cells controlled by a macro base station and a pico base station respectively) should not have contradicting usage of the flexible subframes.

Therefore, embodiments provide that neighbouring base stations coordinate usage of the TDD subframes in order to mitigate inter-cell interference by signalling subframe configuration information through an inter-base station interface, such as X2. This information allows the base stations to take scheduling decisions on the usage of the flexible subframes to minimise interference. Once established, a flexible subframe configuration does not typically change frequently. However, the flexible subframe configuration can change if the balance of UEs in the cell supporting the use of flexible subframes and UEs not supporting the use of flexible subframes changes. For example, if the relative amount of legacy UEs (i.e. UEs that are not adapted for use with newer Releases of the standards and that do not support the use of flexible subframes) in a cell increases then operating the cell with an UL heavy TDD configuration would probably be disadvantageous.

In a first set of embodiments, illustrated with reference to FIGS. 10 to 12, signalling indicating the usage of flexible subframes is exchanged by neighbouring base stations at the setup of the X2 interface.

Figure 10:
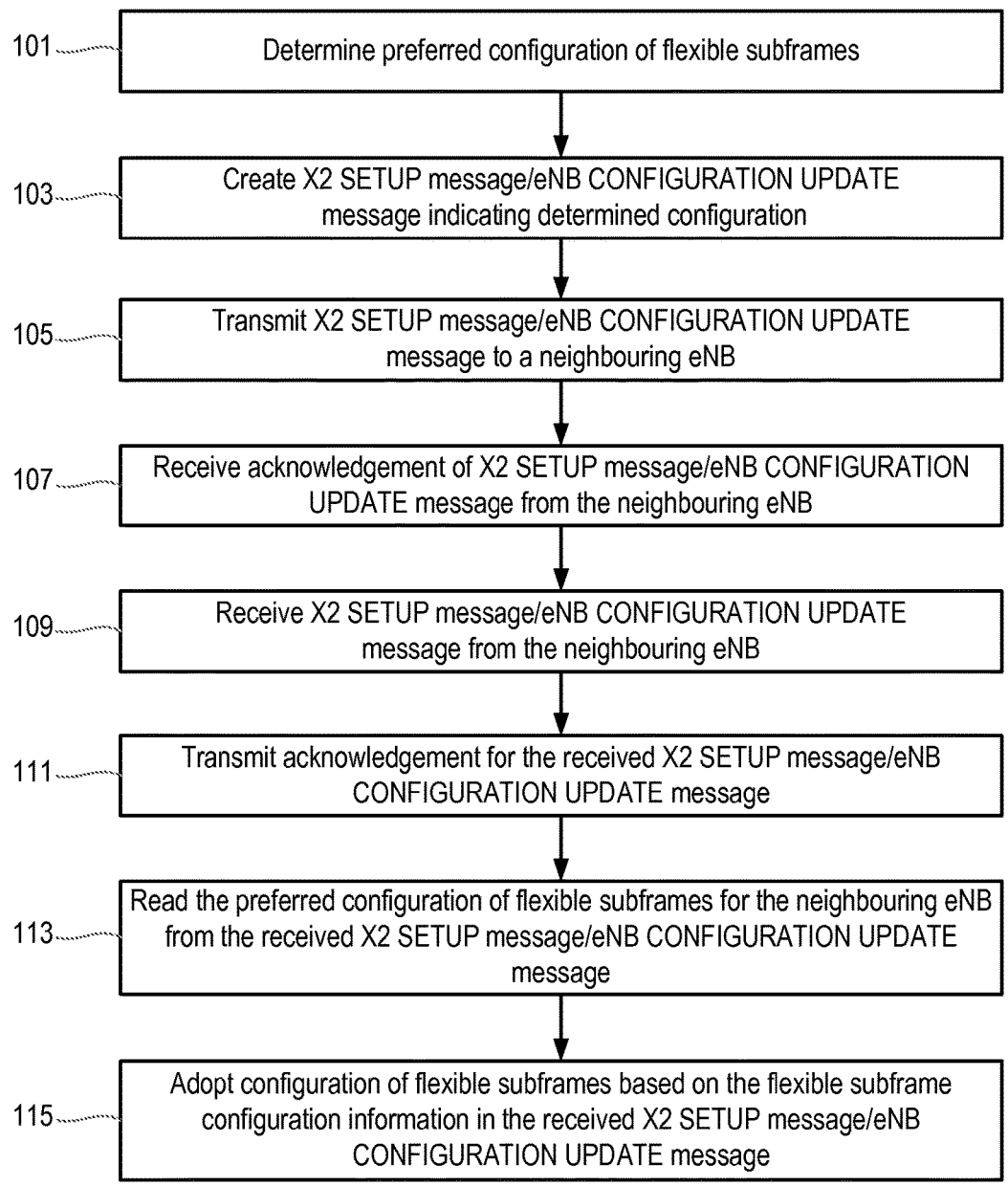
FIG. 10 is a flow chart illustrating a method of operating a base station according to an embodiment.

The flow chart in FIG. 10 illustrates a method of operating a base station (e.g. macro eNB 10) according to some embodiments. It will be appreciated from the following description that this method takes place in each base station involved in the configuration of the flexible subframes.

In a first step, step 101, when the X2 interface is being setup, the base station 10 determines a preferred configuration for the flexible subframes available in a frame. As described above, a frame comprises one or more subframes that are allocated to uplink transmissions, one or more subframes that are allocated to downlink transmissions and one or more flexible subframes that can each be dynamically allocated to uplink transmissions or downlink transmissions according to the preference, the traffic requirements or the predicted traffic requirements of the base station 10.

The base station 10 then creates a message indicating the preferred configuration (step 103). In embodiments described below, the message is an X2 SETUP message or an eNB CONFIGURATION UPDATE message.

The base station 10 then transmits the message to the neighbouring base station(s) (e.g. macro eNB 12 and/or micro eNB 14) (step 105).

An acknowledgement of the message will be sent to the base station 10 by the neighbouring base station 12, 14 and this is received in step 109. In the embodiments described below the acknowledgement messages are the X2 SETUP RESPONSE and eNB CONFIGURATION UPDATE ACKNOWLEDGE.

The base station 10 also receives a message from the neighbouring base station 12, 14 indicating the neighbouring base station's preferred configuration of the flexible subframes (step 109). Again, in the embodiments described below, this message is an X2 SETUP message or an eNB CONFIGURATION UPDATE message.

The base station 10 sends an acknowledgement of the message received in step 109 to the neighbouring base station 12, 14 (step 111).

The base station 10 then reads the neighbouring base station's preferred configuration for the flexible subframes from the received message (step 113), and uses this information to adapt the preferred configuration for the flexible subframes determined in step 101 to reduce or avoid inter-cell interference between the base station 10 and the neighbouring base station(s) 12, 14.

The way in which the base station 10 adapts the preferred configuration for the flexible subframes can be implementation dependent. Each base station (i.e. the base station 10 and the neighbouring base station(s) 12, 14) may implement an algorithm to the preferred configuration and the preferred configuration received from the neighbouring base station(s) to determine the configuration of flexible subframes to use. The base stations 10, 12, 14 may implement the same or different algorithms to determine the configuration of flexible subframes to use.

The adapted flexible subframe configuration is then used by the base station 10 in communications with mobile devices (UEs) 16. In some implementations, the base station 10 and neighbouring base stations 12, 14 may exchange information on the adapted flexible subframe configuration to further reduce the risk of inter-cell interference. This approach of providing further inter-node signalling may be of particular benefit for base stations with a strong interference connection, which is sometimes referred to as Cell Cluster Interference Mitigation (CCIM).

It will be appreciated that steps 105-107 and 109-111 do not necessarily occur or have to occur in the order shown in FIG. 10.

Figure 3:
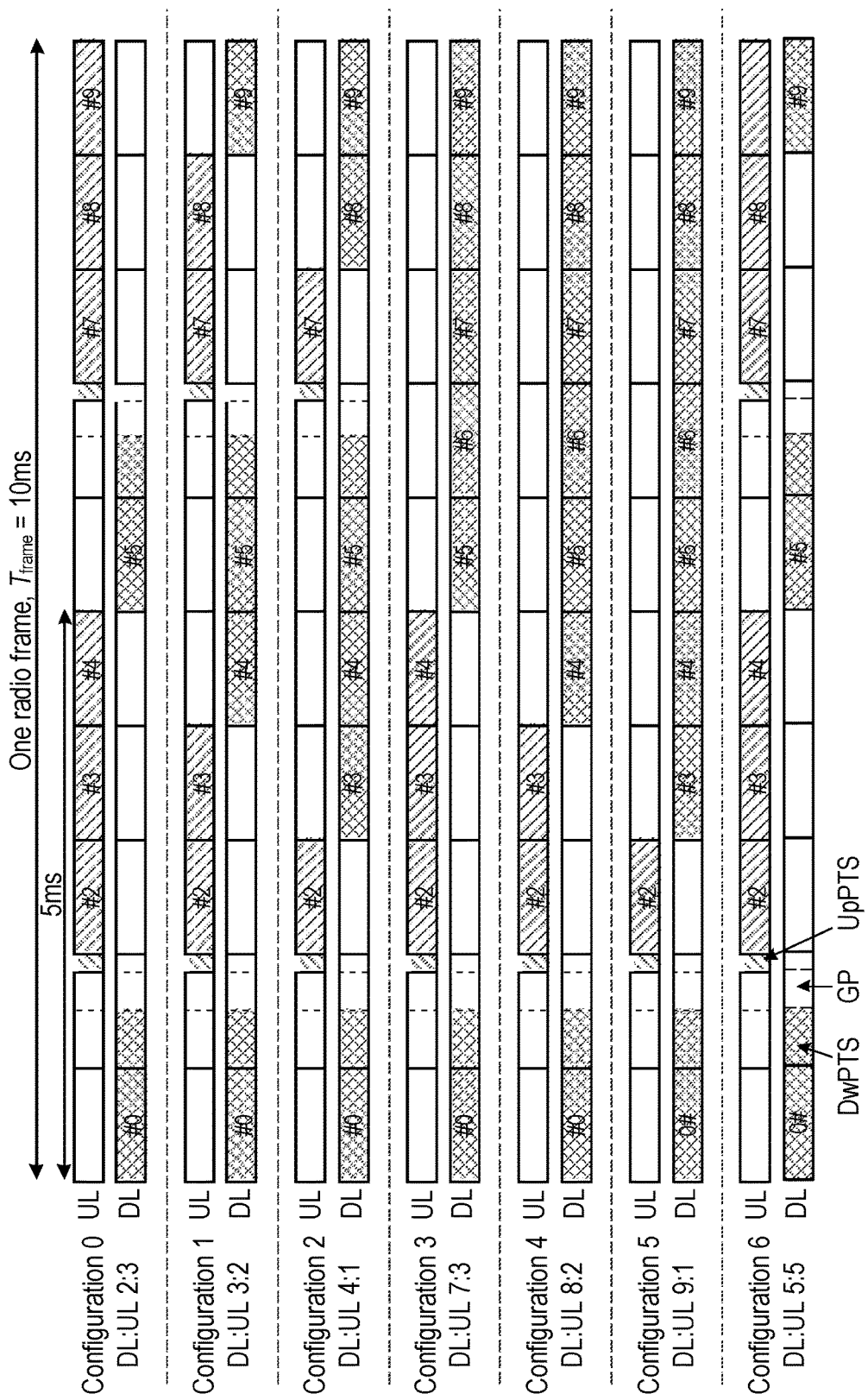
FIG. 3 is a diagram illustrating as an example of seven different downlink/uplink configurations for time division duplex (TDD) in Long Term Evolution (LTE)

A first specific embodiment of a modified X2 SETUP message that can be used to signal the configuration of the flexible subframes is shown in FIG. 11. FIG. 11 is based on the table in section 9.2.8 ("Served Cell Information") of 3GPP TS 36.423 v11.5.0 (2013 June) that shows an information element (IE) that contains configuration information of a cell that a neighbour base station (eNB) may need for the X2 AP interface. In this embodiment, an existing information element relating to subframe configurations is extended to cover possible configurations for flexible subframes. For example, as shown in FIG. 11, the existing Subframe Assignment IE can be extended with new enumerated values which indicate TDD configurations in which some subframes are used for both UL and DL. The existing seven enumerated values in the Subframe Assignment IE correspond to configurations 0 to 6 in FIG. 3. In some cases new enumerated values can point to a new (or extended) table of UL/DL TDD configurations where the flexible subframes are explicitly stated. For example, "sa7" could refer to UL/DL configuration "sa0" with subframes 3, 4, 8 and 9 being flexible.

A second specific embodiment of a modified X2 SETUP message that can be used to signal the configuration of the flexible subframes is shown in FIG. 12. Like FIG. 11, FIG. 12 is based on the table in section 9.2.8 ("Served Cell Information") of 3GPP TS 36.423 v11.5.0 (2013 June). In this embodiment, a new TDD configuration field is provided in the X2 SETUP message to signal the flexible subframe configuration. In FIG. 12 this new field is labelled "Flexible Subframe Assignment IE" and contains an enumerated value. This new field is interpreted together with the existing Subframe Assignment IE (which is used conventionally). The new IE could indicate the flexible subframes of the signalled UL/DL TDD configuration (sa0, sa1, sa6). For example, a bitmap of e.g. 10 bits (one bit per subframe of the radio frame) could be signalled in the "Flexible Subframe Assignment IE" to indicate the flexible subframes, or may only indicate which of the "UL" subframes in the signalled UL/DL TDD configuration can also be used for DL transmissions. Alternatively, the "Flexible Subframe Assignment IE" can signal a different one of the UL/DL TDD configurations to that contained in the Subframe Assignment IE, and the subframes for which the UL/DL configuration differs with respect to the Flexible Subframe Assignment IE and Subframe Assignment IE are determined to be the flexible subframes. For example, if the Subframe Assignment IE indicates "sa0" (DL:UL 2:3 in FIG. 3) and the new Flexible Subframe Assignment IE" indicates "sa1" (DL:UL 3:2 in FIG. 3) then the flexible subframes are subframe #4 and #9.

The information listed above for the detection of flexible subframe configuration could be added also to the eNB CONFIGURATION UPDATE message. In fact, this message has the purpose of amending information initially exchanged via X2 setup procedures. Hence, the eNB CONFIGURATION UPDATE message could be used to update (in case they have been already set) or configure from scratch (if not already set in X2 setup procedures), the additional information that has been described above.

By means of the information added in the X2 SETUP and eNB CONFIGURATION UPDATE message and by means of other information specifying the usage of the flexible subframes in each base station, it is possible to use flexible subframes for scheduling traffic that could be subject to or that could generate interference.

It will be appreciated that the above embodiments can result in there being a delay in a new flexible subframe configuration being adopted since it is necessary to receive an acknowledgement from the neighbouring base station for the X2 SETUP message or eNB CONFIGURATION UPDATE message that contains the preferred flexible subframe configuration information. The delay with which the new flexible subframe configuration can be adopted in the sending base station can depend on the signalling propagation delays to and from the receiving (neighbouring) base station. If the flexible subframe configuration needs to be modified very frequently, e.g. on a per millisecond basis, these delays could be prohibitive.

Thus, in a second set of embodiments, illustrated with reference to FIGS. 13-16, the signalling delays associated with the first set of embodiments are reduced. In particular, unlike the X2 SETUP and eNB CONFIGURATION UPDATE procedures, which require the receiving base station to produce an acknowledgement message once the configuration information is received, the second set of embodiments make use of a procedure that does not require a receiving base station to produce an acknowledgement message once the information is received. In these embodiments, the flexible subframe configuration information is sent to the receiving base station and the signalled configuration can be adopted by the sending base station before or immediately after sending the signalling. Thus, this embodiment is more practical for scenarios where flexible subframe configurations may change frequently.

Figure 13A:
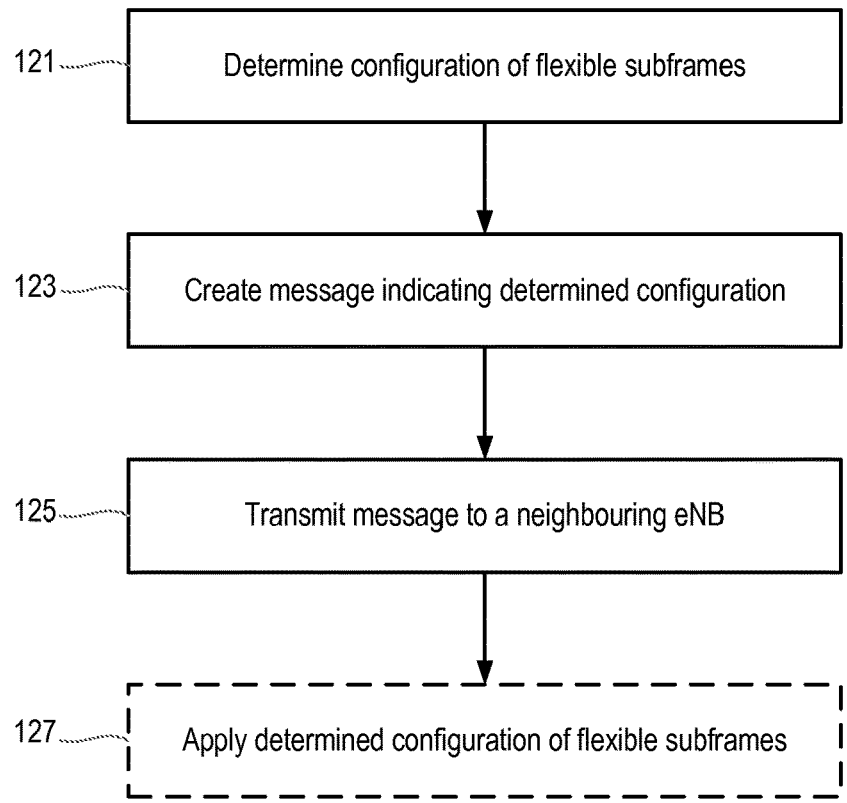
FIGS. 13(a) and 13(b) are flow charts illustrating methods of operating a base station according to another embodiment.

The flow chart in FIG. 13(a) illustrates a method of operating a base station (e.g. macro eNB 10) according to the second set of embodiments.

In a first step, step 121, the base station 10 determines a preferred configuration for the flexible subframes available in a frame. The preferred configuration for the flexible subframes in a frame may be the preferred configuration for which subframes in the frame are the flexible subframes, or may be the preferred configuration for the way in which the (or the specified) flexible subframes are to be used (i.e. for uplink or downlink).

The base station 10 then creates a message indicating the preferred configuration (step 123). In embodiments described below, the message can be part of a new procedure dedicated to the transmission of the flexible subframe configuration information (which may contain similar information to that shown in FIG. 11 or 12), or it (i.e. the message, which may contain similar information to that shown in FIG. 11 or 12) can be added to an existing procedure that does not require an acknowledgement to be sent for particular messages. One such existing procedure is the LOAD INFORMATION procedure, and this is described in more detail below.

After step 123, the base station 10 then transmits the message to the neighbouring base station(s) (e.g. macro eNB 12 and/or micro eNB 14) (step 125).

After sending the message in step 125, the base station 10 adopts the flexible subframe configuration (step 127) and applies it in communications with mobile devices (UEs) 16.

Although not illustrated in FIG. 13(a), it will be appreciated that if the neighbouring base station 12, 14 is also configured according to the method in FIG. 13(a), that neighbouring base station 12, 14 may transmit a message to the base station 10 indicating the neighbouring base station's preferred configuration of the flexible subframes. In that case, the base station 10 can read the neighbouring base station's preferred configuration for the flexible subframes from the received message and potentially use this information to adapt the preferred configuration for the flexible subframes determined in step 121 to reduce or avoid inter-cell interference between the base station 10 and the neighbouring base station(s) 12, 14.

As in the first set of embodiments above, the way in which the base station 10 adapts the preferred configuration for the flexible subframes can be implementation dependent. Each base station (i.e. the base station 10 and the neighbouring base station(s) 12, 14) may implement an algorithm to the preferred configuration and the preferred configuration received from the neighbouring base station(s) to determine the configuration of flexible subframes to use. The base stations 10, 12, 14 may implement the same or different algorithms to determine the configuration of flexible subframes to use.

The adaptation of the preferred configuration for the flexible subframes may comprise changing which subframes are flexible (i.e. which subframes can be used for either uplink or downlink as opposed to being fixed uplink subframes or fixed downlink subframes) or changing the way in which a flexible subframe is used (e.g. changing whether the flexible subframe is to be used as an uplink subframe or a downlink subframe).

The adapted flexible subframe configuration is then used by the base station 10 in communications with mobile devices (UEs) 16. In some implementations, the base station 10 and neighbouring base stations 12, 14 may exchange information on the adapted flexible subframe configuration to further reduce the risk of inter-cell interference. This further exchange of information can be done in the same way as the initial communication of the preferred flexible subframe configuration (i.e. using a message that indicates the configuration). It will be appreciated that in this case, the 'adapted flexible subframe configuration' can be considered the new 'preferred flexible subframe configuration' for the base station 10.

Figure 13B:
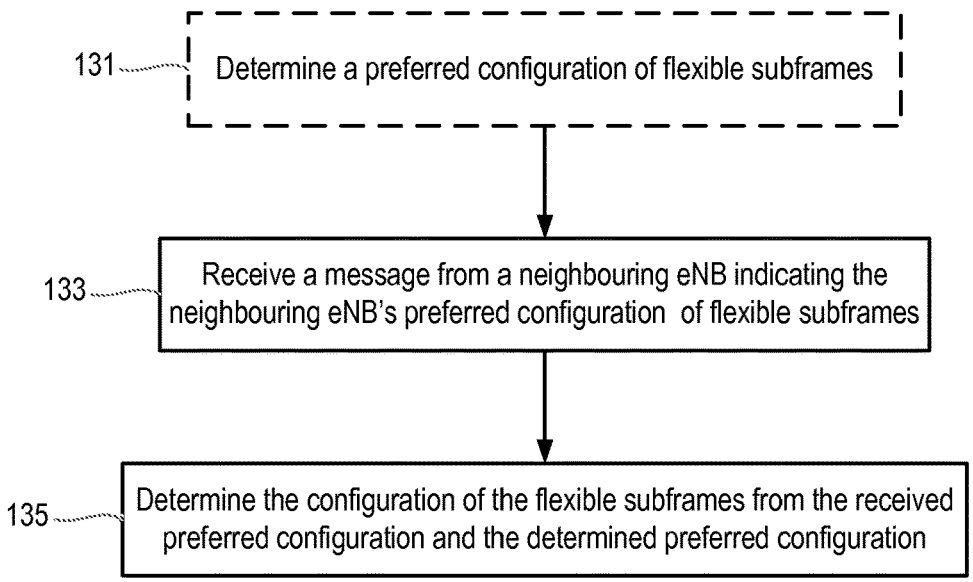

As noted above, FIG. 13(a) illustrates a method of operating a base station from the 'transmitting' point of view (i.e. in that method the message indicating the preferred configuration is transmitted to the neighbouring node). For completeness, FIG. 13(b) illustrates a method of operating a base station (e.g. macro eNB 12) according to the 'receiving' point of view. However, it will be appreciated that in many practical implementations of the techniques disclosed herein, a base station will be adapted to perform both sides of the method; that is a base station will not only be adapted to operate to determine a preferred configuration of the flexible subframes and transmit a message indicating that configuration to a neighbouring node, but the base station will also be adapted to receive a corresponding message from the neighbouring base station and to initially choose or subsequently adapt its preferred configuration of the flexible subframes based on the received message.

Thus, in step 131 of FIG. 13(b), the base station (e.g. macro eNB 12) can determine a preferred configuration of flexible subframes. This step can be performed in a similar way to step 121 above.

The base station 12 then receives a message from a neighbouring base station (e.g. macro eNB 10) indicating the neighbouring node's preferred flexible subframe configuration (step 133).

In step 135 the base station 12 determines the configuration of the flexible subframes from the preferred configuration determined in step 131 and the preferred configuration received in step 133.

Although not illustrated in FIG. 13(b), the base station 12 can then use the configuration determined in step 135 for communicating with UEs 16 in that cell.

FIG. 14 illustrates one way in which the flexible subframe configuration information can be included in a modified LOAD INFORMATION procedure. The LOAD INFORMATION message is sent by an eNB to neighbouring eNBs to transfer load and interference co-ordination information. The table in FIG. 14 is based on the table in section 9.1.2.1 ("LOAD INFORMATION") of 3GPP TS 36.423 v11.5.0 (2013 June). In this embodiment, a new field is provided to signal the flexible subframe configuration that is labelled "Flexible Subframes Pattern Info".

The Flexible Subframe Pattern IE can be one of two types. In one type the Flexible Subframe Pattern IE can be used or read in combination with the flexible subframe configuration information shown in FIG. 11 or FIG. 12 which is signalled, for example, via X2 SETUP REQUEST/RESPONSE messages or eNB CONFIGURATION UPDATE REQUEST/RESPONSE messages. According to this type, the Flexible Subframe Pattern IE in the LOAD INFORMATION message consists of information indicating if the pre-configured flexible subframes are used for UL or DL. In this case the Flexible Subframe Pattern IE can be provided in the form of a bit map IE, for example of length 10 (although other lengths can be used as appropriate), where each bit corresponds to a subframe in a frame and indicates whether the subframe is allocated to uplink or downlink (e.g. a '1' value can correspond to UL, and a '0' value can correspond to DL). The use of a new IE (the Flexible Subframe Pattern IE in this case) in combination with the existing Subframe Assignment IE is described above with reference to FIG. 11. The use of a new Flexible Subframe Pattern IE in combination with the embodiment shown in FIG. 12 would indicate how the flexible subframes are currently used which means that the bitmap indicates either UL or DL.

In a second type, the Flexible Subframe Pattern IE can be used to indicate both the flexible subframe pattern (either as an update of previously signalled patterns or as the only mechanism to indicate such pattern) plus the UL/DL utilisation of each flexible subframe. In this case the Flexible Subframe Pattern IE could consist of two sets of information, for example two bitmaps, which are shown in FIG. 15. FIG. 16 illustrates how these two bitmaps can be used to signal a flexible subframe configuration. A first bitmap 200 specifies the flexible subframe pattern, e.g. by each bit in the bitmap representing a subframe, and a '1' value indicating that the corresponding subframe is flexible and a '0' value indicating that the subframe is preconfigured as an UL or DL frame. In the illustrated example, subframe nos. #2, #3, #7 and #8 are marked as flexible. The second bitmap 202 specifies the subframe utilisation or configuration with, e.g., each bit in the bitmap representing a subframe #0 to #9 and a value of '1' indicating that the subframe is used for UL, and a value of '0' indicating that the subframe is used for DL. Thus, the second bitmap 202 in FIG. 16 indicates that the fixed or preconfigured subframes #0, #1, #4, #5, #8 and 9 are allocated to DL, DL, DL, UL, DL and DL respectively, and the flexible subframes #2, #3, #7 and #8 are dynamically allocated to UL, DL, UL and DL respectively to provide the UL/DL pattern shown at the top of FIG. 16.

In addition to the exchange of the flexible subframe configuration information between base stations as described above, further embodiments provide that information on the transmission power to be used for particular subframes and/or particular directions (e.g. UL or DL) is also be transmitted to neighbouring base stations to assist in determining the most appropriate flexible subframe configuration to use to minimise inter-cell interference. This additional information can be provided on a per physical resource block (PRB) and/or per subframe basis.

The information currently exchanged via X2 SETUP REQUEST messages includes an IE called the relative narrowband transmit power (RNTP) IE which provides information regarding frequency resources only, i.e. it provides per PRB information. In the further embodiments, this IE can be enhanced to provide an indication of the DL transmission power on a per PRB and/or per subframe basis.

With this enhancement it is possible for the receiving node to understand what transmission power will be used for resources in the time and frequency domain in case such resources are used for DL. It will be appreciated that the information added to the RNTP IE in the X2 SETUP REQUEST message may also or alternatively be added to the eNB CONFIGURATION UPDATE message.

The enhanced RNTP information should be used in combination with information indicating the usage (i.e. UL or DL) of the resource blocks. The provision of this information is described below.

The additional information can, in some embodiments, indicate a transmission power threshold above which transmission shall not occur (i.e. it can indicate a maximum transmission power). In the example of LTE, the new information may be included as part of the LOAD INFORMATION procedure. FIG. 17 illustrates part of the LOAD INFORMATION message that can be modified to indicate this information. In particular, a new information element, for example labeled "UL Resource Usage IE", can be added to indicate this information.

The table in FIG. 18 illustrates how the UL transmission power information can be presented in the modified LOAD INFORMATION message. It can be seen that the UL Resource Usage IE contains a per subframe and per PRB level indication of how the resource is used (i.e. UL or DL). For each subframe and PRB the transmission power threshold below which transmission power will be maintained is indicated in the 'UL power Tx threshold' IE.

With the information shown in FIGS. 17 and 18 the receiving base station is able to estimate the time and frequency domain resources for which UL interference may be experienced. For such resources the base station may decide not to schedule UL transmissions but to use them instead for DL.

It will be appreciated that similarly to the UL Resource Usage IE, another IE could be defined for DL resource block usage.

In further additional or alternative embodiments, information concerning experienced interference levels can be sent from a base station (the 'victim' base station) to the base station causing the interference (the 'aggressor' base station). As an example, in LTE the interference level information can be sent via the LOAD INFORMATION message. This message already contains an UL Interference Overload Indication IE, which provides interference levels (high, medium, low) experienced by the transmitting node's cell in uplink on a per PRB basis. In order to use this information for the purpose of adapting the scheduling of the aggressor base station to avoid interference, the information needs to be enhanced with time domain indications. The IEs shown in FIG. 19 provide a way of communicating this information to the aggressor base station.

The modified information provided in the IEs in FIG. 19 represent the level of interference experienced by a base station in a given cell in UL on a subframe and resource block basis. On receipt of this information the aggressor base station may decide to either reduce transmission power on the affected subframes and PRBs or to configure those resources in the most appropriate way, i.e. for UL or DL, e.g. depending on UE geometry and on relative position of victim and aggressor nodes. UE geometry refers to the received power, S, on common reference signal (CRS) from the serving base station relative to the sum of received powers, I, on CRSs from all neighbouring base stations plus thermal noise power, N. In particular, the UE geometry is given by $S/(I\_1+I\_2+I\_3+ \ldots +N)$. In a fully loaded network, the UE geometry is the same as the SINR. The relative position means the (radio) distance to the serving base station versus the distance to the dominant interfering base station.

Thus, in some implementations, interference level information received from a neighbouring base station (which indicates the interference experienced by that neighbouring base station in its uplink subframes) can be used by a base station 10, 12, 14 to determine a flexible subframe configuration (e.g. in step 121 of FIG. 13(*a*) or steps 131 or 135 of FIG. 13(*b*)). It will also be appreciated that the interference level information sent from the neighbouring base station can also provide information to the base station 10, 12, 14 on the flexible subframe configuration being used by the neighbouring base station. For example, the base station 10, 12, 14 may be using a particular flexible subframe for downlink while the neighbouring base station uses it for uplink, and therefore the neighbouring base station may indicate high uplink interference to the base station 10, 12, 14 for that subframe. The base station 10, 12, 14 can then infer from the high uplink interference indication that the neighbouring base station is using that subframe as an uplink subframe.

In another embodiment, once the flexible subframe configuration has been signalled between two base stations, a base station can signal information regarding traffic demand in UL and DL to the neighbouring base station(s). This information can be used by the neighbouring base station(s) to understand how to allocate flexible subframes to UL or DL in light of the traffic demand needs of its neighbouring cells. In some cases this information consists of average UL and DL throughputs (where throughput is approximately equal to the bitrate*the number of subframes/10) which could for example be communicated either via new messages or via existing messages such as the RESOURCE STATUS UPDATE message over X2. A relatively high throughput in DL would likely indicate a rather large DL usage of the flexible subframes within the interfering cell. A base station receiving such information could then expect high interference in flexible subframes used for UL and then decide to prioritise DL usage of its flexible subframes to minimise the interference. On the other hand, a relatively high throughput in UL would likely indicate a rather large UL usage of the flexible subframes and the base station receiving this throughput information would then expect less interference in flexible subframes used for UL transmissions.

However, in addition taking into account the expected DL and UL radio quality in flexible subframes, the determination of the flexible subframe usage could also be based on the buffer status in UL and DL. For example, a relatively large user-accumulated DL buffer within the cell would imply more DL usage for the flexible subframes.

Thus there are provided various techniques for enabling a base station to communicate or exchange information with another base station or other network node about the configuration of flexible subframes so that the flexible subframes can be allocated in the most appropriate way to minimise inter-cell interference.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a network node in a communication network, the method comprising:
   determining a preferred configuration for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions; and
   transmitting a message to a neighboring network node in the communication network through an inter node interface, the message indicating the preferred configuration for the one or more flexible subframes, wherein the message includes two information elements (IEs), with the first IE indicating which subframes in the frame are flexible subframes and the second IE indicating the uplink or downlink configuration for the indicated flexible subframes.

2. The method of claim 1, the method further comprising adopting the preferred configuration of the one or more flexible subframes after the message is sent to the neighboring network node and using the preferred configuration in communications with mobile devices.

3. The method of claim 1, the method further comprising:
   receiving a message from the neighboring network node through the inter node interface indicating a preferred configuration of the neighboring network node for the one or more flexible subframes in the frame; and
   determining the configuration of the one or more flexible subframes in the frame using the preferred configuration indicated in the received message and the preferred configuration of the network node.

4. The method of claim 3, the method further comprising using the determined configuration in communications with mobile devices once the configuration has been determined.

5. The method of claim 1, wherein the message indicating the preferred configuration for the one or more flexible subframes is sent via an X2 interface between the network nodes.

6. The method of claim 1, wherein the message indicating the preferred configuration for the one or more flexible subframes is included in a message that is used to transfer load and interference co-ordination information between network nodes.

7. The method of claim 6, wherein the message is a LOAD INFORMATION message.

8. The method of claim 1, wherein the first IE indicating which subframes in the frame are flexible subframes signals a different one of an uplink/downlink time division duplex (TDD) configuration to that contained in a Subframe Assignment IE, and wherein the subframes for which the different one of the uplink/downlink configuration differs with respect to the configuration contained in the Subframe Assignment IE are the flexible subframes.

9. The method of claim 1, where the message indicating the preferred configuration for the one or more flexible subframes further comprises information on the interference level experienced by the network node that transmits the message.

10. The method of claim 9, wherein information on the interference level is provided for each subframe and/or resource block.

11. The method of claim 10, wherein the information on the interference level is included in an information element (IE) in a LOAD INFORMATION message.

12. The method of claim 9, wherein the message is a LOAD INFORMATION message and comprises an UL Interference Overload Indication IE that provides interference levels experienced by the network node on a per resource block basis.

13. The method of claim 12, wherein the message further comprises information representing the level of interference experienced by the network node in the cell on a subframe and resource block basis.

14. The method of claim 1, the method further comprising:
receiving a message from the neighboring network node through the inter node interface, the message indicating information on the interference level experienced by the neighboring network node; and
determining the configuration of the one or more flexible subframes in the frame using the information on the interference level and the preferred configuration of the network node.

15. The method of claim 1, further comprising sending information to the neighboring network node on the traffic demand in the uplink to the network node and/or the downlink from the network node.

16. The method of claim 1, wherein the message indicating the preferred configuration for the one or more flexible subframes further comprises information on the transmission power that is going to be used in the frame and/or a maximum transmission power than can be used in the frame.

17. The method of claim 16, wherein the information on the actual and/or maximum transmission power is provided for particular subframes.

18. The method of claim 16, wherein the information on the actual and/or maximum transmission power is provided per physical resource block and/or per subframe in the frame.

19. The method of claim 16, wherein the information on the actual and/or maximum transmission power is included in a relative narrowband transmit power (RNTP) information element (IE) that is adapted to include information on time resources.

20. The method of claim 16, wherein the information on the actual and/or maximum transmission power is included in an information element (IE) in a LOAD INFORMATION message.

21. The method of claim 1, further comprising:
receiving a message from the neighboring network node through the inter node interface, the message indicating information on the transmission power that is going to be used in the frame and/or a maximum transmission power than can be used in the frame; and
determining the configuration of the one or more flexible subframes in the frame using the information on the transmission power and/or maximum transmission power and the preferred configuration of the network node.

22. The method of claim 1, wherein the communication network is a Long Term Evolution (LTE) time division duplex (TDD) network.

23. A non-transitory computer-readable medium having computer readable code embodied therein, the computer readable code being such that, on execution by a suitable computer or processor of a network node in a communication network, the computer or processor causes the network node to:

determine a preferred configuration for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions; and
transmit a message to a neighboring network node in the communication network through an inter node interface, the message indicating the preferred configuration for the one or more flexible subframes, wherein the message includes two information elements (IEs), with the first IE indicating which subframes in the frame are flexible subframes and the second IE indicating the uplink or downlink configuration for the indicated flexible subframes.

24. A network node for use in a communication network, the network node comprising
inter node interface circuitry configured to send and receive messages to and from one or more neighboring network nodes, and
processing circuitry comprising a processor and memory storing instructions executable by said processor, wherein the processing circuit is configured to:
determine a preferred configuration for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions and to form a message indicating the preferred configuration for the one or more flexible subframes, wherein the message includes two information elements (IEs), with the first IE indicating which subframes in the frame are flexible subframes and the second IE indicating the uplink or downlink configuration for the indicated flexible subframes; and
transmit the message to a neighboring network node in the communication network, via the inter node interface circuitry.

25. The network node of claim 24, wherein the processing circuitry is further configured to adopt the preferred configuration of the one or more flexible subframes after the message is sent to the neighboring network node and to use the preferred configuration in communications with mobile devices.

26. The network node of claim 24, wherein the processing circuitry is further configured to:
receive a message from the neighboring network node through the inter node interface indicating a preferred configuration of the neighboring network node for the one or more flexible subframes in the frame; and
determine the configuration of the one or more flexible subframes in the frame using the preferred configuration indicated in the received message and the preferred configuration of the network node.

27. The network node of claim 26, wherein the processing circuitry is further configured to use the determined configuration in communications with mobile devices once the configuration has been determined.

28. The network node of claim 24, wherein the processing circuitry is configured to send the message indicating the preferred configuration for the one or more flexible subframes via an X2 interface between the network nodes.

29. The network node of claim 24, wherein the processing circuitry is configured to indicate the preferred configuration for the one or more flexible subframes in a message that is used to transfer load and interference co-ordination information between network nodes.

30. The network node of claim 29, wherein the message is a LOAD INFORMATION message.

31. The network node of claim 24, wherein the processing circuitry is configured to use the first IE to signal a different one of an uplink/downlink time division duplex (TDD) configuration to that contained in a Subframe Assignment IE, and wherein the subframes for which the different one of the uplink/downlink configuration differs with respect to the configuration contained in the Subframe Assignment IE are the flexible subframes.

32. The network node of claim 24, where the processing circuitry is further configured to transmit the message indicating the preferred configuration for the one or more flexible subframes with information on the interference level experienced by the network node that transmits the message.

33. The network node of claim 32, wherein information on the interference level is provided for each subframe and/or resource block.

34. The network node of claim 33, wherein the processing circuitry is configured to include the information on the interference level in an information element (IE) in a LOAD INFORMATION message.

35. The network node of claim 32, wherein the message is a LOAD INFORMATION message and comprises an UL Interference Overload Indication IE that provides interference levels experienced by the network node on a per resource block basis.

36. The network node of claim 35, wherein the processing circuitry is configured to include in the message information representing the level of interference experienced by the network node in the cell on a subframe and resource block basis.

37. The network node of claim 32, wherein the processing circuitry is further configured to:
receive a message from the neighboring network node through the inter node interface circuitry, the message indicating information on the interference level experienced by the neighboring network node; and
determine the configuration of the one or more flexible subframes in the frame using the information on the interference level and the preferred configuration of the network node.

38. The network node of claim 24, wherein the processing circuitry is further configured to send information to the neighboring network node on the traffic demand in the uplink to the network node and/or the downlink from the network node.

39. The network node of claim 24, wherein the processing circuitry is further configured to include information on the transmission power that is going to be used in the frame and/or a maximum transmission power than can be used in the frame in the message.

40. The network node of claim 39, wherein the processing circuitry is configured to provide information on the actual and/or maximum transmission power for particular subframes.

41. The network node of claim 39, wherein the processing circuitry is configured to provide information on the actual and/or maximum transmission power per physical resource block and/or per subframe in the frame.

42. The network node of claim 39, wherein the processing circuitry is configured to include the information on the actual and/or maximum transmission power in a relative narrowband transmit power (RNTP) information element (IE) that is adapted to include information on time resources.

43. The network node of claim 38, wherein the processing circuitry is configured to include the information on the actual and/or maximum transmission power in an information element (IE) in a LOAD INFORMATION message.

44. The network node of claim 39, wherein the processing circuitry is further configured to:
receive a message from the neighboring network node through the inter node interface circuitry, the message indicating information on the transmission power that is going to be used in the frame and/or a maximum transmission power than can be used in the frame; and
determine the configuration of the one or more flexible subframes in the frame using the information on the transmission power and/or maximum transmission power and the preferred configuration of the network node.

45. The network node of claim 24, wherein the communication network is a Long Term Evolution (LTE) time division duplex (TDD) network.

46. A method of operating a network node in a communication network, the method comprising:
receiving a message from a neighboring network node in the communication network through an inter node interface, the message indicating a preferred configuration of the neighboring network node for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions, wherein the message includes two information elements (IEs), with the first IE indicating which subframes in the frame are flexible subframes and the second IE indicating the uplink or downlink configuration for the indicated flexible subframes; and
determining the configuration of the one or more flexible subframes in the frame using the preferred configuration indicated in the received message.

47. The method of claim 46, the method further comprising the step of using the determined configuration in communications with mobile devices.

48. The method of claim 46, the method further comprising the step of determining a preferred configuration for the one or more flexible subframes in the frame, wherein the step of determining the configuration of the one or more flexible subframes comprises using the preferred configuration of the network node and the preferred configuration of the neighboring network node indicated in the received message.

49. The method of claim 46, wherein the message indicating the preferred configuration for the one or more flexible subframes is received via an X2 interface between the network nodes.

50. The method of claim 46, wherein the message indicating the preferred configuration for the one or more flexible subframes is included in a message that is used to transfer load and interference co-ordination information between network nodes.

51. The method of claim 50, wherein the message is a LOAD INFORMATION message.

52. The method of claim 46, wherein the first IE indicating which subframes in the frame are flexible subframes signals a different one of an uplink/downlink time division duplex (TDD) configuration to that contained in a Subframe Assignment IE, and wherein the subframes for which the different one of the uplink/downlink configuration differs with respect to the configuration contained in the Subframe Assignment IE are the flexible subframes.

53. The method of claim 46, where the message indicating the preferred configuration for the one or more flexible subframes further comprises information on the interference level experienced by the network node that transmits the message.

54. The method of claim 53, wherein information on the interference level is provided for each subframe and/or resource block.

55. The method of claim 54, wherein the information on the interference level is included in an information element (IE) in a LOAD INFORMATION message.

56. The method of claim 53, wherein the message is a LOAD INFORMATION message and comprises an UL Interference Overload Indication IE that provides interference levels experienced by the neighboring network node on a per resource block basis.

57. The method of claim 56, wherein the message further comprises information representing the level of interference experienced by the neighboring network node in the cell on a subframe and resource block basis.

58. The method of claim 53, wherein the step of determining the configuration of the one or more flexible subframes in the frame uses the preferred configuration indicated in the received message and the received information on the interference level.

59. The method of claim 46, the method further comprising the step of receiving information from the neighboring network node on the traffic demand in the uplink to the neighboring network node and/or the downlink from the neighboring network node.

60. The method of claim 46, wherein the received message indicating the preferred configuration of the neighboring network node for the one or more flexible subframes further comprises information on the transmission power that is going to be used in the frame and/or a maximum transmission power than can be used in the frame.

61. The method of claim 60, wherein the information on the actual and/or maximum transmission power is provided for particular subframes.

62. The method of claim 60, wherein the information on the actual and/or maximum transmission power is provided per physical resource block and/or per subframe in the frame.

63. The method of claim 60, wherein the information on the actual and/or maximum transmission power is included in a relative narrowband transmit power (RNTP) information element (IE) that is adapted to include information on time resources.

64. The method of claim 60, wherein the information on the actual and/or maximum transmission power is included in an information element (IE) in a LOAD INFORMATION message.

65. The method of claim 60 further comprising the step of determining the configuration of the one or more flexible subframes in the frame using the received information on the transmission power and/or maximum transmission power and the preferred configuration of the neighboring network node.

66. The method of claim 46, wherein the communication network is a Long Term Evolution (LTE) time division duplex (TDD) network.

67. A non-transitory computer-readable medium having computer readable code stored therein, the computer readable code being such that, on execution by a suitable computer or processor of a network node in a communication network, the computer or processor causes the network node to:
receive a message from a neighboring network node in the communication network through an inter node interface, the message indicating a preferred configuration of the neighboring network node for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions, wherein the message includes two information elements (IEs), with the first IE indicating which subframes in the frame are flexible subframes and the second IE indicating the uplink or downlink configuration for the indicated flexible subframes; and
determine the configuration of the one or more flexible subframes in the frame using the preferred configuration indicated in the received message.

68. A network node for use in a communication network, the network node comprising
inter node interface circuitry configured to send and receive messages to and from one or more neighboring network nodes, and
processing circuitry comprising a processor and memory storing instructions executable by said processor, wherein the processing circuit is configured to:
receive a message from a neighboring network node in the communication network via the inter node interface circuitry, the message indicating a preferred configuration of the neighboring network node for one or more flexible subframes in a frame, the frame comprising one or more subframes allocated to uplink transmissions, one or more subframes allocated to downlink transmissions and one or more flexible subframes that can each be dynamically allocated to either uplink transmissions or downlink transmissions, wherein the message includes two information elements (IEs), with the first IE indicating which subframes in the frame are flexible subframes and the second IE indicating the uplink or downlink configuration for the indicated flexible subframes; and
determine the configuration of the one or more flexible subframes in the frame using the preferred configuration indicated in the received message.

69. The network node of claim 68, wherein the processing circuitry is further configured to use the determined configuration in communications with mobile devices.

70. The network node of claim 68, wherein the processing circuitry is further configured to determine a preferred configuration for the one or more flexible subframes in the frame, wherein the determination of the configuration of the one or more flexible subframes uses the preferred configuration of the network node and the preferred configuration of the neighboring network node indicated in the received message.

71. The network node of claim 68, wherein the message indicating the preferred configuration for the one or more flexible subframes is received via an X2 interface between the network nodes.

72. The network node of claim 68, wherein the message indicating the preferred configuration for the one or more flexible subframes is included in a message that is used to transfer load and interference co-ordination information between network nodes.

73. The network node of claim 72, wherein the message is a LOAD INFORMATION message.

74. The network node of claim 68, wherein the first IE indicating which subframes in the frame are flexible subframes signals a different one of an uplink/downlink time division duplex (TDD) configuration to that contained in a Subframe Assignment IE, and wherein the subframes for which the different one of the uplink/downlink configuration differs with respect to the configuration contained in the Subframe Assignment IE are the flexible subframes.

75. The network node of claim 68, where the message indicating the preferred configuration for the one or more flexible subframes further comprises information on the interference level experienced by the network node that transmits the message.

76. The network node of claim 75, wherein information on the interference level is provided for each subframe and/or resource block.

77. The network node of claim 76, wherein the information on the interference level is included in an information element (IE) in a LOAD INFORMATION message.

78. The network node of claim 75, wherein the message is a LOAD INFORMATION message and comprises an UL Interference Overload Indication IE that provides interference levels experienced by the neighboring network node on a per resource block basis.

79. The network node of claim 75, wherein the message further comprises information representing the level of interference experienced by the neighboring network node in the cell on a subframe and resource block basis.

80. The network node of claim 70, wherein the processing circuit is configured such that the determination of the configuration of the one or more flexible subframes in the frame uses the preferred configuration indicated in the received message and the received information on the interference level.

81. The network node of claim 68, wherein the processing circuitry is further configured to receive information from the neighboring network node on the traffic demand in the uplink to the neighboring network node and/or the downlink from the neighboring network node.

82. The network node of claim 68, wherein processing circuit is further configured to receive information on the transmission power that is going to be used in the frame and/or a maximum transmission power than can be used in the frame in the message.

83. The network node of claim 82, wherein processing circuit is configured to receive information on the actual and/or maximum transmission power for particular subframes.

84. The network node of claim 82, wherein processing circuit is configured to receive information on the actual and/or maximum transmission power per physical resource and/or per subframe block in the frame.

85. The network node of claim 82, wherein processing circuit is configured to receive the information on the actual and/or maximum transmission power in a relative narrowband transmit power (RNTP) information element (IE) that is adapted to include information on time resources.

86. The network node of claim 82, wherein processing circuit is configured to receive the information on the actual and/or maximum transmission power in an information element (IE) in a LOAD INFORMATION message.

87. The network node of claim 82, wherein the processing circuit is further configured to determine the configuration of the one or more flexible subframes in the frame using the received information on the transmission power and/or maximum transmission power and the preferred configuration of the neighboring network node.

88. The network node of claim 68, wherein the communication network is a Long Term Evolution (LTE) time division duplex (TDD) network.

* * * * *

UNITED STATES PATENT AND TRADEMARK OFFICE
CERTIFICATE OF CORRECTION

PATENT NO. : 10,306,625 B2
APPLICATION NO. : 14/385784
DATED : May 28, 2019
INVENTOR(S) : Centonza et al.

It is certified that error appears in the above-identified patent and that said Letters Patent is hereby corrected as shown below:

In the Specification

In Column 6, Line 38, delete "than" and insert -- that --, therefor.

In Column 9, Line 7, delete "FIG. 8" and insert -- FIG. 8) --, therefor.

In Column 14, Line 41, delete "IE"" and insert -- IE --, therefor.

In the Claims

In Column 20, Line 60, in Claim 9, delete "where" and insert -- wherein --, therefor.

In Column 21, Line 31, in Claim 16, delete "than" and insert -- that --, therefor.

In Column 21, Line 53, in Claim 21, delete "than" and insert -- that --, therefor.

In Column 22, Line 18, in Claim 24, delete "comprising" and insert -- comprising: --, therefor.

In Column 23, Line 14, in Claim 32, delete "where" and insert -- wherein --, therefor.

In Column 23, Line 55, in Claim 39, delete "than" and insert -- that --, therefor.

In Column 24, Line 13, in Claim 44, delete "than" and insert -- that --, therefor.

In Column 25, Line 5, in Claim 53, delete "where" and insert -- wherein --, therefor.

In Column 25, Line 40, in Claim 60, delete "than" and insert -- that --, therefor.

In Column 26, Line 25, in Claim 68, delete "comprising" and insert -- comprising: --, therefor.

Signed and Sealed this
Twentieth Day of August, 2019

Andrei Iancu
*Director of the United States Patent and Trademark Office*

In Column 27, Line 13, in Claim 75, delete "where" and insert -- wherein --, therefor.

In Column 28, Line 9, in Claim 82, delete "than" and insert -- that --, therefor.